W. E. MOORE.
ARC TYPE ELECTRIC FURNACE AND METHOD OF OPERATING THE SAME.
APPLICATION FILED JULY 30, 1917.
1,326,083.
Patented Dec. 23, 1919.
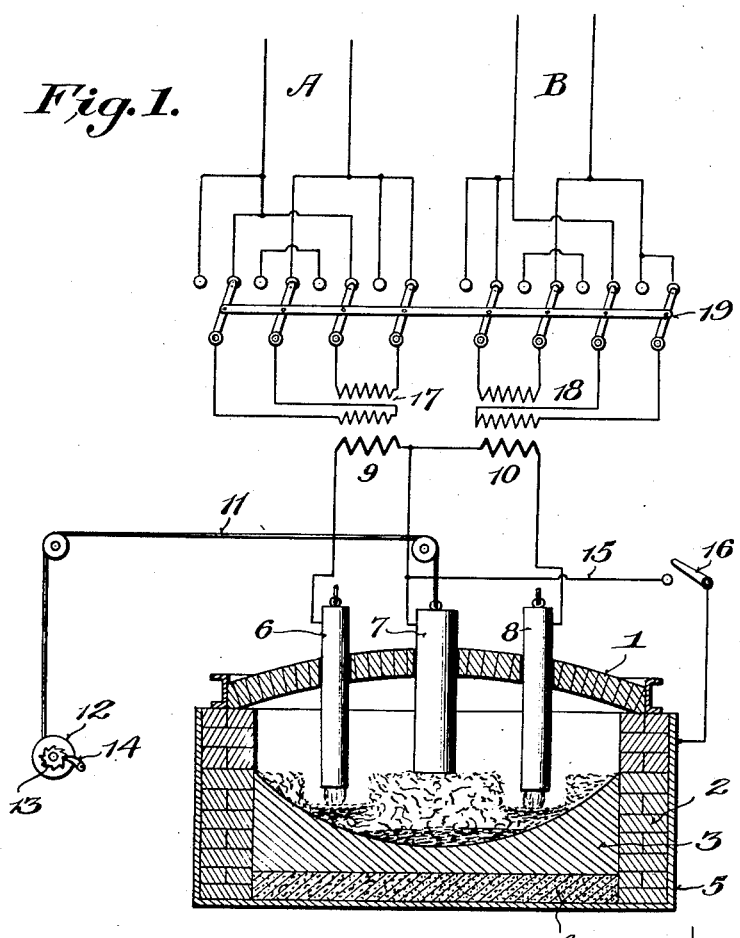
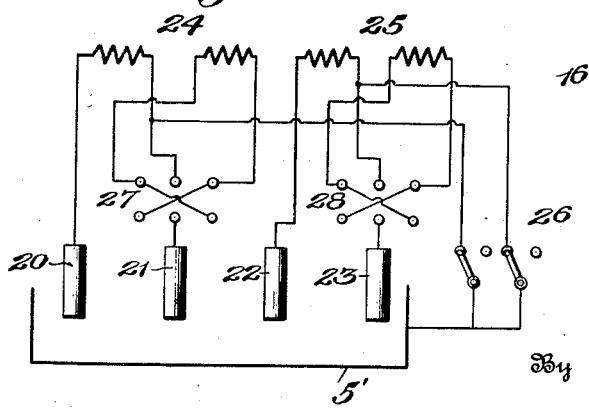
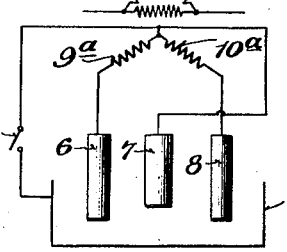
Inventor
William E. Moore,
By Nolt & Symons
his Attorneys

UNITED STATES PATENT OFFICE.

WILLIAM E. MOORE, OF PITTSBURGH, PENNSYLVANIA, ASSIGNOR TO PITTSBURGH ENGINEERING WORKS, OF PITTSBURGH, PENNSYLVANIA, A CORPORATION OF PENNSYLVANIA.

ARC-TYPE ELECTRIC FURNACE AND METHOD OF OPERATING THE SAME.

1,326,083. Specification of Letters Patent. Patented Dec. 23, 1919.

Application filed July 30, 1917. Serial No. 183,568.

*To all whom it may concern:*

Be it known that I, WILLIAM E. MOORE, a citizen of the United States, residing at Pittsburgh, in the county of Allegheny and State of Pennsylvania, have invented certain new and useful Improvements in Arc-Type Electric Furnaces and Methods of Operating the Same, of which the following is a specification.

The object of this invention is to effect certain improvements in the manufacture of steel, its alloys, and other metals, in an electric furnace.

In certain furnaces, which have heretofore been made of the multi-electrode type, the arc has been drawn with two electrodes in series, as, for example, in the Heroult furnace where the three arcs are connected to the three poles of a three-phase transformer which makes the common connection between the arcs or forms the neutral, thus throwing two arcs in series. This arrangement has the advantage of permitting a high power in-put to the furnace which works well after the furnace has once been started with molten metal, or after the cold scrap has become melted down. However, when the charge of cold scrap is being melted, a longer arc than may be effected by said arrangement is desirable so as to cause less violent short circuits as the cold pieces of scrap tumble into the pool of molten metal formed immediately under the arc. Such arc has a tendency to melt a crater or "well" down through the scrap equal to the diameter of the electrode plus a radius equal to the length of the arc, and with a long arc it will be seen that this "well" is proportionately larger in diameter and, therefore, less liable to cause short circuits by pieces of cold scrap tumbling into the crater. Also, a long arc gyrates sufficiently to melt down a large enough body of metal to prevent a small pool of highly superheated metal forming under an electrode which tends to burn through the furnace bottom. My invention is particularly directed to the formation and maintenance of such long arcs.

In carrying out my invention, I employ two or more electrodes in polyphase formation, but when melting, lower one electrode into contact with the scrap or material to be melted, leaving no arc to be formed at that point and allowing the electrode to follow the scrap down by gravity as the scrap is dissolved or made molten by the bath which is formed on the furnace bottom, the entire voltage of the circuits being then maintained on the other electrode or electrodes of the series. After the bath has become molten or nearly so, the electrode forming a contact with the metal is adjusted to form an arc therebetween and the metal, and by suitable switching arrangement the voltage delivered to all the electrodes reduced and the arcs shortened to correspond.

I also contemplate during this latter stage of the operation to cause all of the current from the smaller electrodes to flow from said electrodes to the bath (the larger one being lifted out of arcing range), from the bath through the furnace bottom, and thence through a common return to the secondary transformer system.

In order to more fully describe my invention, reference will be had to the accompanying drawings, wherein:—

Figure 1 is a diagram showing one embodiment of apparatus for carrying out my said invention;

Fig. 2, a diagram showing one modification thereof; and

Fig. 3, a diagram showing another modification thereof.

Referring first to the form of my invention illustrated in Fig. 1, the furnace proper or crucible is the known type, comprising, among other parts, an arched top 1 and side walls 2 of suitable refractory brick. The bottom of the furnace comprises a lining formed preferably of two layers 3 and 4, the former being composed of magnesite, dolomite, chromite, ganister, or other suitable refractory material, and the latter of a mixture of refractory material and better electrically conducting material, such, for example, as carbon, graphite, or other suitable conducting material, the mixture progressively increasing in conductivity toward the bottom, and rammed or sintered in. My invention, however, is not limited to any particular construction of furnace crucible further than that the said construction shall embody characteristics which permit the carrying out of my invention. The sides and bottom of the furnace are inclosed in a metal casing or shell 5.

This furnace is equipped with three arcing electrodes 6, 7 and 8 connected in circuit with secondaries 9 and 10 of two transformers on a two-phase power circuit. The central electrode 7 is preferably of greater diameter than the other electrodes and is connected intermediate of secondaries 9 and 10 to form a common return. Suitable means are provided for supporting and vertically adjusting these electrodes. As indicating one such means, I have shown one electrode, the electrode 7, supported by a cable 11 which passes over pulleys to a winding drum 12 having a ratchet 13 and pawl 14 whereby the electrode may be supported at any desired height or allowed to descend by gravity, as hereinafter described.

For the purpose of connecting the metal shell 5 of the furnace as a part of the common return of the transformer secondary system, I provide for connecting said casing through a conductor 15 and switch 16 to a point intermediate of secondaries 9 and 10.

The primary transformer system comprises two primaries 17 and 18, each having two individual coils which, by means of a switch 19, may be connected either in series or multiple in the two-phase power circuit A—B. When the switch 19 is shifted to the right, as shown, the primary coils of each transformer are connected in multiple with each other, and when said switch is shifted to the left are connected in series.

In melting down the charge of cold scrap, electrode 7 is lowered into contact with the charge and allowed to rest with its full weight thereon, while the other electrodes are raised and long arcs caused to play between them and the charge, thus throwing the entire voltage of the circuit on the latter electrodes. This condition is maintained until the charge becomes molten, when the larger or common return electrode 7 is raised to draw an arc between it and the metal. At, or about the same time, the electrodes 6 and 8 are lowered, their arcs shortened and voltage reduced.

After the furnace charge has become molten, it is unnecessary and undesirable to employ so large a power input, and on this account I provide, through the operation of the switch 19, means whereby the arc voltage may be reduced. With the series multiple arrangement shown, the voltage may be reduced one-half by changing the secondary connections from multiple to series. Obviously, by employing a greater number of coils in each transformer secondary, the ratio of change may be greater.

Or, after the furnace charge has become molten and the bottom of the furnace rendered electrically conductive by the heat therein developed, the switch 16 may be closed and electrode 7 raised out of contact with the bath, thereby connecting the furnace bottom in circuit as a common return and causing the arcing currents to pass from the other electrode arcs and through the furnace bottom. Lifting the larger electrode 7 out of contact with the metal charge and out of arcing distance, subdivides the voltage and, therefore, protects the refractory linings of the furnace. The lifting of this electrode also prevents contamination of the metal charge by the material of the electrode.

The three electrodes may be connected in a three-phase circuit, as in a three-phase, three-arc furnace, and one of the electrodes lowered into contact with the charge, as described. Ordinarily this would produce an undesirable balance in the power of the three-phases of the circuit, but this objection may be overcome by the open delta connection shown in Fig. 2, where $9^a$ and $10^a$ represent the secondary windings having their outer terminals connected, respectively, to electrodes 6 and 8, while the center electrode 7 and the furnace bottom are electrically connected to a neutral point in the secondary system, the three-phase primary of this transformer being indicated at $18^a$.

In Fig. 3, I have shown an arrangement for operating according to my invention on a two-phase circuit employing two pairs of electrodes 20—21 and 22—23, each pair operating on one phase and the middle points of the transformer secondaries 24 and 25 adapted to be connected through switch 26 to the metal casing 5′ of the furnace bottom.

When melting down the charge in this arrangement, one electrode of each or either pair may be lowered into contact with the scrap, and the entire voltage of each phase thrown on an arc maintained between the electrode of such pair and the charge. When heating the charge subsequent to melting, as in refining, for example, I preferably reverse the direction of one-half of the coil of each secondary by means of switches 27 and 28 so that each electrode draws its own arc substantially as if it were a single phase arc, the current passing from the individual electrodes into the molten metal, through the furnace bottom, and thence through switch 26 back to the transformer.

Without limiting my invention to the specific embodiment thereof herein shown and described, what I claim is:—

1. The method of melting metal in an arc type electric furnace having a plurality of electrodes, which consists in effecting a short circuit or contact between the charge and one of said electrodes while maintaining an arc between the charge and another of said electrodes, and subsequently forming an arc between the formerly short circuited electrode and the charge.

2. The method of melting metal in an arc type electric furnace having a plurality of electrodes, which consists in effecting a short circuit or contact between the charge and one of said electrodes while maintaining an arc between the charge and another of said electrodes, subsequently forming an arc between the formerly short circuited electrode and the charge, and maintaining an arc between the other electrode and the charge and shortening the last-mentioned arc.

3. The method of melting metal in an arc type electric furnace having a plurality of electrodes, which consists in effecting a short circuit or contact between the charge and one of said electrodes while maintaining a long arc of high voltage between the charge and another of said electrodes, and subsequently forming shorter arcs of lower voltage between both said electrodes and the metal charge.

4. The method of melting metal in an arc type electric furnace having a plurality of electrodes, which consists in effecting a short circuit or contact between the charge and one of said electrodes while maintaining a long arc of high voltage between the charge and another of said electrodes, subsequently forming shorter arcs of lower voltage between both said electrodes and the metal charge, and causing the current to flow from said arcs through the metal, the furnace bottom and a common return, to the secondary transformer system.

5. An electric furnace having an electrically conducting bottom and three arcing electrodes, in combination with a two-phase transformer secondary circuit in which said electrodes are connected, means to connect the furnace bottom as a common return in the transformer secondary circuit, groups of transformer primaries, and switching means for connecting the coils of said groups in series or multiples to vary the voltage supplied to said electrodes.

6. An electric furnace having an electrically conducting bottom and one or more arcing electrodes, and a common return electrode adapted to be lowered into contact with the metal charge in reducing the same to a molten state, and a transformer secondary connected in open delta formation to supply current to said electrodes, and means to connect the furnace bottom and the common return electrode to a neutral point in said transformer connections.

In testimony whereof I affix my signature.

WILLIAM E. MOORE.